United States Patent [19]

Chambers et al.

[11] 4,267,749

[45] May 19, 1981

[54] COMPACT REVERSIBLE VARIABLE SPEED TRANSMISSION AND DIFFERENTIAL

[75] Inventors: Robert O. Chambers, Peoria; Robert N. Stedman, Chillicothe, both of Ill.

[73] Assignee: Caterpillar Tractor Co., Peoria, Ill.

[21] Appl. No.: 84,289

[22] Filed: Oct. 12, 1979

[51] Int. Cl.³ .................... F16H 37/06; F16H 15/16
[52] U.S. Cl. .................................. 74/690; 74/378; 74/193
[58] Field of Search ............... 74/690, 378, 333, 355, 74/361, 193, 191

[56] References Cited

U.S. PATENT DOCUMENTS

| 1,512,007 | 10/1924 | Klausmeyer | 74/378 |
| 2,333,682 | 11/1943 | Schneider | 74/378 |
| 2,503,891 | 4/1950 | Van Voorhis | 74/378 |
| 2,546,064 | 3/1951 | Gerst | 74/361 |
| 3,535,954 | 10/1970 | Chambers et al. | 74/720.5 |
| 4,152,946 | 5/1979 | Kemper | 74/193 |

Primary Examiner—Kenneth Dorner
Attorney, Agent, or Firm—Wegner, Stellman, McCord, Wiles & Wood

[57] ABSTRACT

A compact reversible variable speed clutch transmission and differential including a rotable input shaft having a drive gear (76), forward and reverse gears (88,84) engaged with the drive gear on opposite sides thereof, and a pair of selectively operable clutches each having an input (92) connected to an associated one of the forward and reverse gears and an output (94). The clutch outputs are connected to the inputs (110) of a variable speed nutating transmission (120) which includes a pair of independently rotatable outputs (116). The transmission includes a pair of nutating elements (130) each having a surface (132) which is a non-cylindrical surface of revolution. The elements are mounted for rotation by a mounting device (126,128) for rotation and there is included a pair of drive units (134) one for each nutating element, fixedly connecting thereto and to an associated one of the outputs. Included is a pair of second drive units (140,142) one for each nutating element and in frictional engagement with the surface of revolution thereof. The second drive unit may be selectively moved along the associated surface of revolution for speed variation if moved together in concert or, to provide for differential action if moved differentially.

4 Claims, 4 Drawing Figures 6,267,749

COMPACT REVERSIBLE VARIABLE SPEED TRANSMISSION AND DIFFERENTIAL

DESCRIPTION

1. Technical Field

This invention relates generally to drive trains, and more particularly, to a compact drive train component, namely, a self contained reversible, variable speed, transmission and differential.

2. Background Art

In many instances, the size of a vehicle is in part dictated by the size of various drive train components. The vehicle length and height most frequently are affected. Consequently, various types of vehicles frequently have been constructed with a taller profile and/or greater length then necessary for the vehicle when considering the applications to which the vehicle is to be put.

Vehicle mass may be commensurately increased as well as certain handling qualities. For example, a vehicle with a relatively tall profile will usually have a higher center of gravity than a similar vehicle with a lesser height. Increasing the length of a vehicle can adversely affect its manuverability when in use.

Over the years, there have been many proposals for drive train components which may be regarded as unconventional in the sense that they differ substantially from industry norms and while employed to some degree, are not employed in the majority of cases. In the main, such proposals have accomplished their goals in terms of reducing overall vehicle height and/or length. However, most frequently, the means used are of considerable mechanical complexity with respect to their more conventional counterparts and consequently, more prone to break-down and more difficult to service.

The present invention is directed to overcoming one or more of the problems as set forth above.

DISCLOSURE OF THE INVENTION

In one aspect of the present invention there is provided a compact, reversible, variable speed transmission which includes a rotatable input shaft having a drive gear and which is adapted to be connected to a prime mover for rotation about a first axis. Forward and reverse gears are mounted for rotation on an axis or axes non-parallel to the first axis and are engaged with the drive gear while being disposed on opposite sides thereof. There is provided a pair of selectively operable clutches each having an input and an output with the input of each being connected to an associated one of the forward and reverse gears. Also included is a variable speed nutating transmission having a pair of independently rotatable outputs and an input connected to both the clutch outputs for rotation about a second axis. The transmission includes a pair of nutating elements each having a surface configuration defined by a non-cylindrical surface of revolution having an axis of revolution. Means mount each of the elements for rotation about a third axis coincident with the axis of revolution. The mounting means are mounted for rotation about an axis different than the third axis. A pair of rotatable drive units is provided, one for each nutating element, and each is fixedly connected to the associated nutating element. A pair of second drive units is provided, one for each nutating element, and each is in frictional contact with the surface of revolution of the associated nutating element. Means are provided for selectively moving each of the second drive units along the associated surface of revolution while maintaining frictional engagement therewith. Means are provided for connecting the mounting means to one or the other of the transmission input and a corresponding one of the transmission outputs along with means connecting the rotatable drive units to the other of the mounting means and a corresponding one of the transmission outputs.

Consequently, forward and reverse rotation of the transmission outputs may be achieved by selectively engaging one or the other of the clutches. Variable speeds may be obtained by moving both of the second drive units in concert along their respective surfaces of revolution.

Other objects advantages will become apparent from the following specification taken in connection with the accompanying drawings.

BEST MODE FOR CARRYING OUT THE INVENTION

Figure 1:
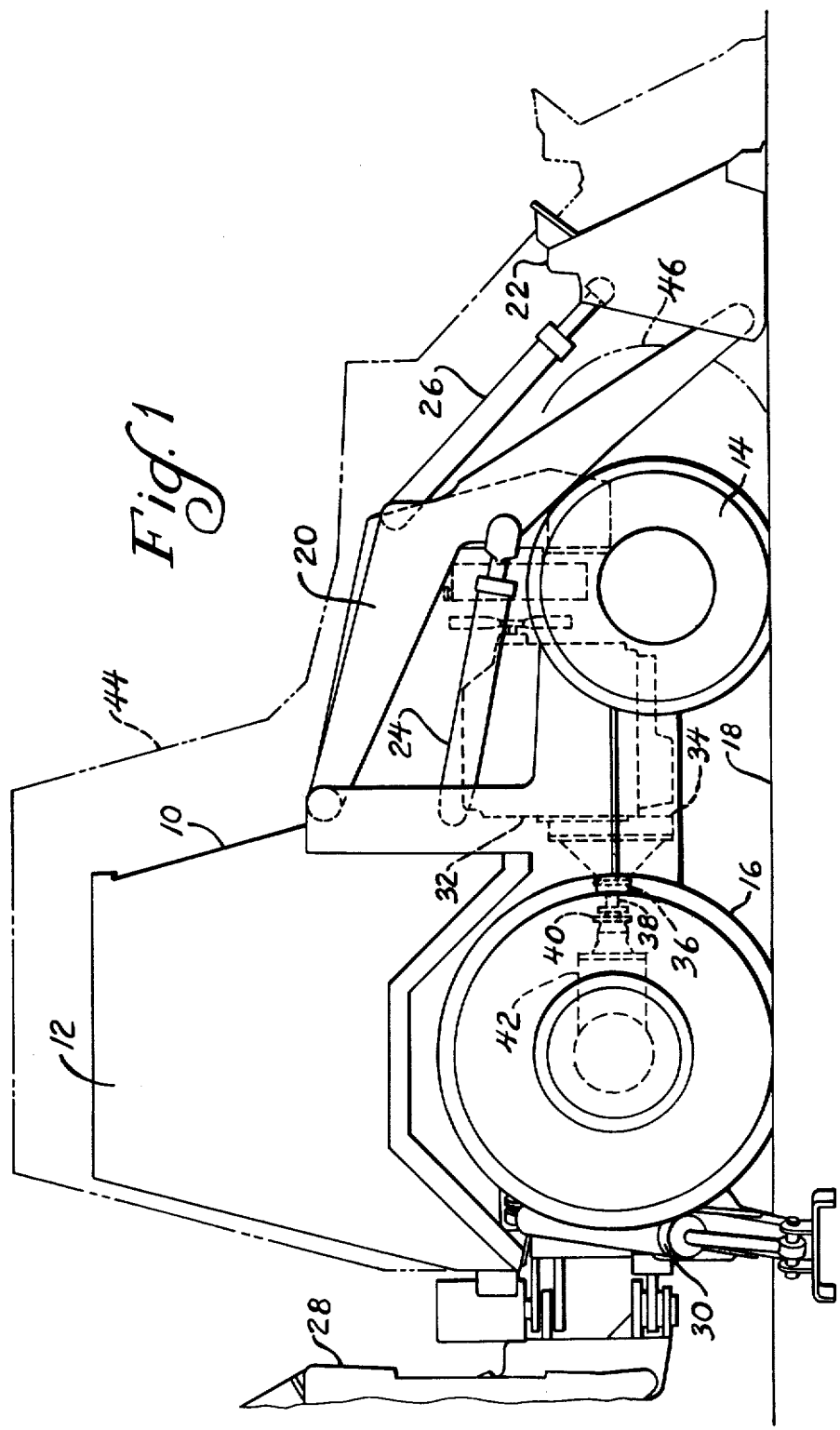
FIG. 1 is a side elevation of a vehicle embodying a compact, reversible, variable speed transmission and differential made according to the invention and additionally contains, in dotted line form, the outline of an otherwise identical vehicle utilizing conventional drive line components.

An exemplary embodiment of a vehicle utilizing a transmission and differential made according to the invention is illustrated in FIG. 1 in the form of a front end loader. The vehicle includes a body 10 provided with a cab 12 for housing the operator thereof. The body 10 includes suitable frame members (not shown) which ultimately mount front wheels 14 and rear wheels 16 for engagement with the underlying terrain 18. Lift arms 20 pivoted to the front of the vehicle mount a bucket 22 for loading purposes. The attitude of the arms 20 with respect to the body 10 can be controlled through hydraulic cylinders 24 interconnecting the body 10 and lift arm 20. The attitude of the bucket with respect to the lift arms 20 can be controlled by similar hydraulic cylinders 26 interconnecting the bucket 22 and the lift arms 20.

At the rear of the vehicle, there may be mounted a conventional backhoe construction 28 (only part of which is shown) and when such is the case, both sides of the vehicle may mount selectively extendable outriggers 30 for stabilization purposes.

In the case of the vehicle illustrated in FIG. 1, the rear wheels 16 are driven by power provided by a prime mover 32 in the form of an internal combustion engine. An output therefrom extending from a flywheel housing 34 is connected via a first universal joint 36 to an extremely short drive shaft 38 which in turn is connected to another universal joint 40. The universal joint 40 is also connected to the input shaft of a compact, reversible, variable speed transmission and differential 42 made according to the invention which, in turn, drives the rear wheels 16.

At this point, it should be observed that the invention is not limited to use with wheeled vehicles. As will become apparent from the following description of the transmission and differential, the same may also be employed with efficacy in crawler type vehicles as well.

Finally, FIG. 1 includes a vehicle height and length profile line designated 44 which illustrates the profile of a similar vehicle if made with the usual, conventional drive line components. A dotted line in FIG. 1 shown at 46 illustrates the position of the front wheel of the prior art vehicle, the rear wheel of the prior art vehicle coinciding with the location of the rear wheel 16 as illustrated in FIG. 1.

Figure 2:
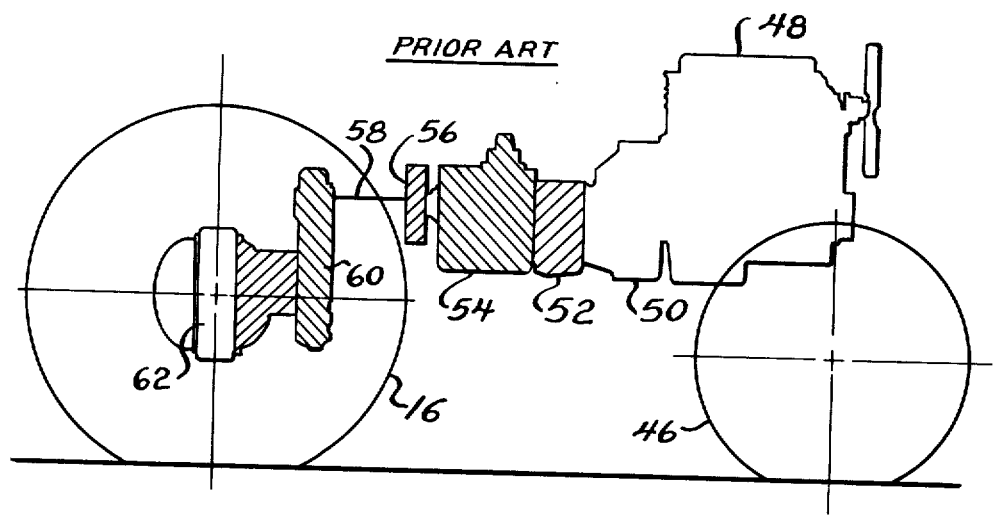
FIG. 2 is a somewhat schematic, side elevation of the drive line and wheels of a prior art construction.
Figure 3:
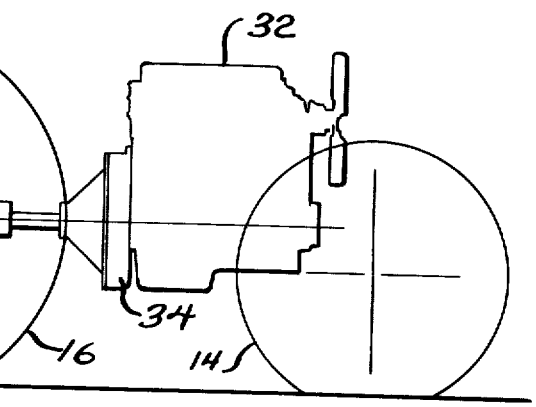
FIG. 3 is a view similar to FIG. 2 but illustrating the drive line components of an otherwise similar vehicle but utilizing the transmission and differential of the present invention.

Turning now to FIGS. 2 and 3, various vehicle components have been stripped away to provide a comparison of the prior art vehicle (FIG. 2) with the corresponding vehicle embodying a compact, reversible, variable speed clutch, transmission and differential assembly made according to the invention (FIG. 3). In FIG. 3, the components previously described in connection with FIG. 1 have been given like reference numerals.

In FIG. 2, the conventional vehicle front wheel occupies the position illustrated at 46 while the rear wheel occupies the position illustrated at 16. An internal combustion engine 48, substantially identical in size to the engine 32 is employed. Its output is taken from a flywheel housing 50 of length approximately equal to the flywheel housing 34 to a clutch 52. From the clutch 52, rotational power is directed to a conventional five speed forward, five speed reverse transmission 54. The output from the transmission 54 is taken through a brake 56 and then via a drive shaft shown schematically at 58 to a so-called drop box 60 and then as an input to the vehicle differential 62. Comparing FIGS. 2 and 3, which are drawn to the same scale, provides a clear illustration of how the present invention can be employed to reduce both height and length of a vehicle.

Figure 4:
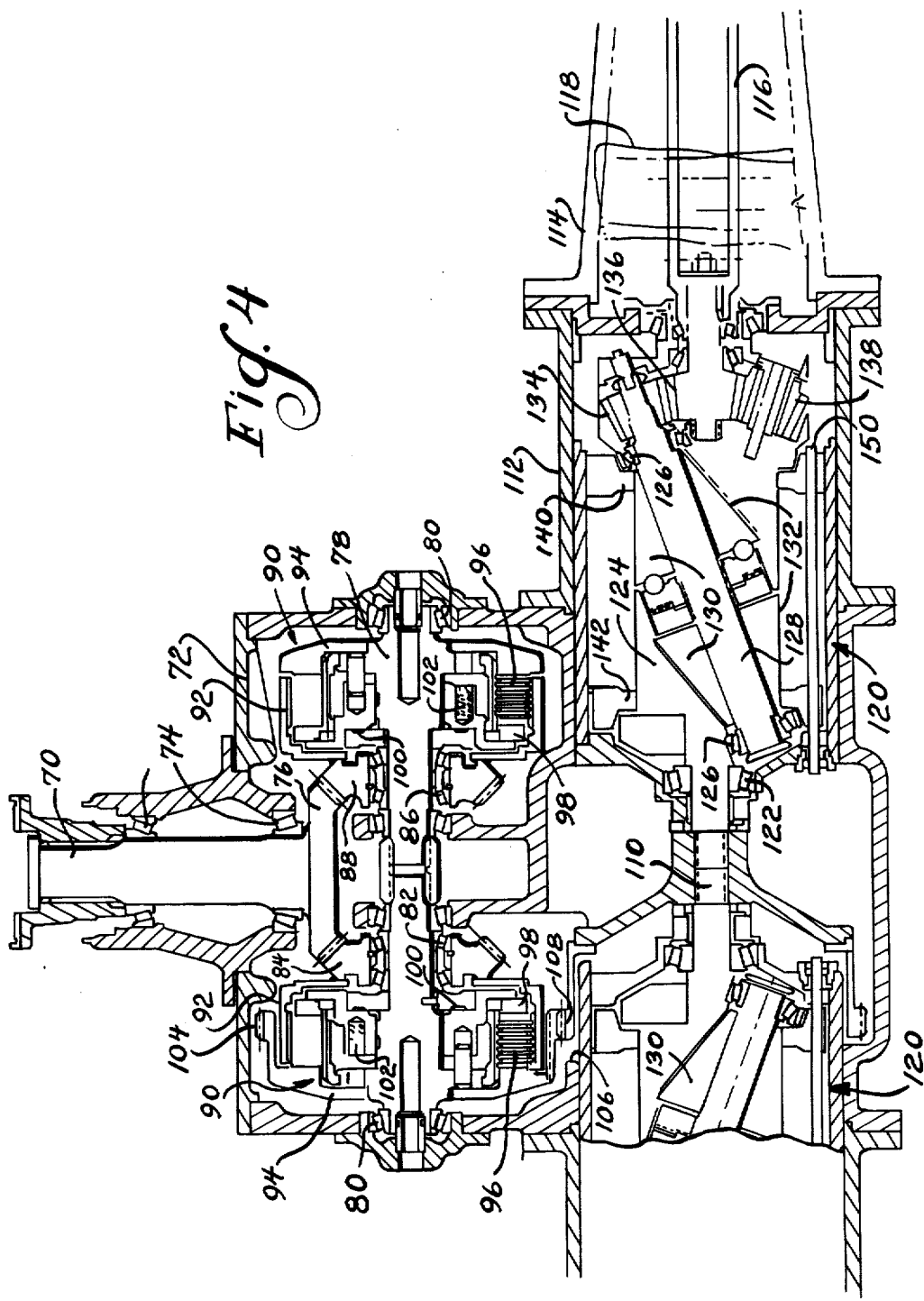
FIG. 4 is a sectional view through the transmission and differential of the present invention.

Turning now to FIG. 4, the clutch, transmission and differential of the present invention will be described in detail. The same includes an input shaft 70 connectable via the universal joint 40 (FIG. 1) ultimately to the internal combustion engine 32. The input shaft 70 enters a housing 72 configured as illustrated and is journalled by bearings 74 therein. The internal end of the input shaft 70 mounts a bevel gear 76. Journalled within the housing 72 is a cross shaft 78. The shaft 78 is journalled by bearings 80 located at opposite sides of the housing 72 for rotation about an axis which intersects the axis of rotation of the shaft 70 at right angles.

Inwardly of the ends of the shaft 78, the same journals, as by bearings 82, a reverse gear 84 which is meshed with the bevel gear 76. The shaft 78 also journals, as by bearings 86, on the opposite side of the axis of rotation of the shaft 70, a forward gear 88, which is also in mesh with the gear 76.

Because the gears 84 and 88 are on opposite sides of the gears 76 and are both meshed therewith, with respect to their axis of rotation, namely, that provided by the shaft 78, for any given rotation of the shaft 70, the reverse gear 84 will be rotating in one direction while the forward gear 88 will be rotating in the opposite direction.

Within the housing 72, and outboard of the gears 84 and 88 are corresponding clutches, each generally designated 90. The clutches 90 preferably are conventional, hydraulically engaged, spring disengaged clutches although in some cases, spring engaged, hydraulically disengaged clutches may be preferred. Both may be identical, one to the other. For purposes of the present invention, it is sufficient to note that each has a rotatable input bell housing 92 suitably secured to the associated one of the forward and reverse gears 84 and 88. Thus, the clutch inputs 92 rotate about the axis of the shaft 78.

Each clutch 90 further includes an output member 94 which is secured to the shaft 78 and consequently, rotatable about the axis thereof. Interleaved clutch plate packs 96 are axially compressible by pistons 98 when pressurized by hydraulic fluid applied to annuluses 100. As is well known, alternate ones of the disks in each pack 98 are splined to the input 92 and the remainder splined to the output 94 of the associated clutch 90. Springs 102 act in bucking relation to the pistons 98 to cause retraction of the same when pressure fluid is not applied to the corresponding one of the annuluses 100.

In any event, when one or the other of the packs 96 is compressed, friction between alternate ones of the disks in each pack increases to the point where the input 92 is frictionally locked to the output 94 of the associated clutch 90.

As seen in FIG. 4, the output 94 of the lefthand clutch 90 includes a peripheral, exterior, gear 104 which extends in adjacentcy to an opening 106 in the side of the housing 72 opposite from the input shaft 70. The gear 104 is in mesh with a gear 108 secured by the means illustrated to in input shaft 100 within a tubular housing 112 on which the housing 72 is mounted and to which it is secured. The housing 112 contains a transmission and differential component for the drive system of the invention to be described and, at its opposite ends, may have axle housings 114 (only one of which is shown) secured thereto. Within the axle housings 114 are axles 116 which extend to the wheels 16 in a conventional fashion. If desired, the axle housings 114 may include brake systems 118 associated with corresponding axle 116 for purposes of braking the associated wheel 16.

Returning to the housing 112, the same contains a variable speed transmission of the nutating type which also may act as a differential as will be seen. In particular, two nutating units, each generally designated 120 are contained within the housing 112, one for each axle 116. The particular form of nutating unit employed forms no part of the present invention but for illustrating purposes, may be considered to be that disclosed in U.S. Pat. No. 4,152,946 issued on May 8, 1979 to Kemper, the details of which are herein incorporated by reference. Solely for insuring a complete understanding of the invention, one of the nutating units 120 will be described to some specificity, it being understood that for additional details, reference may be had to the previously identified Kemper patent, and it being further understood that insofar as the illustrated embodiment is concerned, the two nutating units 120 may be considered to be identical.

The shaft 110 is mounted for rotation about an axis which preferably is parallel to the axis of rotation of the shafts 78. Bearings 122 are employed for this purpose. Within each nutating unit 120, the shaft 110 may take the form of a partial housing 124 which, by means of bearings 126, mounts a shaft 128 for rotation within the shaft or housing 124. The axis of rotation of the shaft 128 is non-parallel and non-perpendicular to the axis of rotation of the shaft 110 and intersects the same. Secured to the shaft 128 within the housing 124 of each nutating unit 120 is a pair of nutating elements 130 which have surfaces 132 configured as non-cylindrical surfaces of revolution. In the illustrated form, the surfaces are conical.

The end of each shaft 128 remote from the input shaft 110 fixedly mounts a first drive unit in the form of a gear 134. That is, the gear 134 is mounted for rotation with the shaft 128. The gear 134 is, in turn, in mesh with a gear 136 which is suitable connected to the associated one of the axles 116. If desired, the housing 124 may carry an idler gear 138 for balancing purposes.

Each nutating unit 120 includes second drive units in the form of a pair of friction rings 140 and 142. The friction rings 140 and 142 do not rotate within the housing 112 but may be moved in concert toward one another along the axis of the intput shaft 110. The arrangement is such that for all positions of the friction rings 140 and 142 within the tubular housing, they will frictionally engage the surface of revolution 132 of their corresponding nutating element 130. As is well known, for a given rate of rotation of the input shaft 110, the rate of rotation of the output gear 136 can be varied through a finite range by shifting the friction rings 140 and 142 while maintaining the same in frictional contact with their associating nutating element 130. The rings 140 and 142 have a large opening as compared to the size of the nutating elements 130 and as a consequence,, make essentially only point contact with the surface of revolution thereof. The point contact literally races about the conical periphery of the corresponding nutating element 130 and this will, in turn, cause the corresponding nutating element 130 to rotate about the axis defined by the shaft 128. Where the point contact exists at a relatively small diameter of the cone-shaped surface of revoluation, there will be a more rapid rate of rotation of the nutating element than when the friction rings are moved to a position corresponding to a greater cone diameter.

The friction rings 140 and 142 are moved towards and away from each other by reason of an interconnection including an equally, oppositely pitched screw shaft 150. One end of the shaft 150 is pitched in one direction while the other end of the shaft is pitched in the opposite direction. The ring 140 is threaded to one end of the shaft 150 and the ring 142 to the opposite end thereof. Therefore, rotation of the shaft 150 by any suitable control element such as a motor or the like (not shown) will cause equal, but opposite, linear movement of the rings 140 and 142 towards and away from each other. Now it should be observed that in each nutating unit 120, the nutating elements 130 and the rings 140 and 142 are essentially duplicated. If desired, only one of the nutating elements 130 and its corresponding friction ring 140 or 142 could be employed. The duplication is provided principally for the purpose of insuring mechanical balance in a rotating system, and, to a lesser degree, to provide more positive frictional contact.

It should also be noted that the invention contemplates that the friction rings 140 and 142 of each nutating unit 120 can be independently controlled from their counterparts in the other nutating unit. For example, it is considered that, for the relation shown in FIG. 4, that the rings 140 and 142 associated with the righthand nutating unit 120 be in the position illustrated while the corresponding rings in the lefthand unit 120 can be independently movable to an entirely different relative position. As illustrated, the rings 140 and 142 at the righthand unit are riding on the small diameters of the surfaces of revolution 132 while the corresponding rings in the lefthand unit 120 could be riding on the large diameters of the corresponding surfaces of revolution. In such a case, the rate of rotation of the righthand axle 116 would be quite different than that of the lefthand axle.

INDUSTRIAL APPLICABILITY

As will be appreciated from the foregoing description, a clutch, transmission and dirrerential assembly made according to the invention is extremely compact enabling the size of the vehicle with which it is used to be significantly reduced from that which would be required if conventional components were employed. Reversibility of direction of the axles 116 can be obtained by selective engagement of the clutches 90. For example, when it is desired that the axles 116 rotate in a direction corresponding to a forward direction, the clutch 90 associated with the forward gear 88 is engaged while the clutch 90 associated with the reverse gear 84 is disengaged. When a reverse direction is required, the clutch 90 connected to the reverse gear 84 is engaged while the clutch 90 connected to the forward gear 88 is disengaged.

A full range of speed variation in either direction, as determined by the ultimate construction of the nutating units 120, is attainable simply by moving the friction rings in each of the units 120 in concert with each other. That is, all rings should be moved so as to be disposed on identical diameters of their corresponding surfaces of revolution 132. This will provide equal rates of revolution of each of the axles 116.

When differential action is required, the friction rings of one unit are moved differentially with respect to the friction rings of the other unit to achieve the desired difference in rates of revolution of the corresponding axles 116 as mentioned previously.

To completely declutch the axles 116 from the prime mover, it is only necessary to disengage both of the clutches 90.

Finally, parking brakes typically employed in such vehicles may be eliminated through the use of spring engaged, hydraulically disengaged clutches as the clutches 90. In such a case, with the engine off, both clutches will be engaged by their respective springs and the friction rings 140 and 142 of the nutating units 120 will operate to halt rotation of the various components to provide a brake for the vehicle.

We claim:

1. A compact, reversible, variable speed clutch, transmission and differential comprising:
    a rotatable input shaft (70) having a drive gear (76) therein and adapted to be connected to a prime mover for rotation about a first axis;
    forward and reverse gears (88,84) mounted for rotation about an axis or axes non-parallel to said first axis, said forward and reverse gears being engaged with said drive gear with said forward gear (88) being located oppositely from said reverse gear (84) with respect to said first axis;
    a pair of selectively operable clutches (90) each having an input (92) and an output (94), the input of one clutch being connected to said forward gear and the input of the other clutch being connected to said reverse gear; and
    a variable speed nutating transmission means having a pair of independently rotatable outputs (116) and an input (110) connected to both said clutch outputs for rotation about a second axis, said transmission means further including a pair of nutating elements (130) each having a surface (132) configuration defined by a non-cylindrical surface of revolution having an axis of revolution, means (126,128) mounting each of said elements for rotation about a third axis coincident with said axis of revolution, said mounting means being mounted for rotation about an axis different than said third axis, a pair of rotatable drive units (134), one for each nutating element, fixedly connected to the associated nutating element, a pair of second drive units (140,142), one for each nutating element, in frictional engagement with the surface of revolution of the associated nutating element, means (150) for selectively moving each of said second drive units along the associated surface of revolution while maintaining frictional engagement therewith, means (124) connecting said mounting means to one of said transmission means input and a corresponding one of said transmission means outputs, and means (136) connecting said rotatable drive units to the other of said mounting means and a corresponding one of said transmission means outputs;

whereby (a) forward and reverse rotation of said transmission means outputs may be achieved by selectively engaging one or the other of said clutches, (b) variable speeds may be obtained by moving both said second drive units in concert along their respective surfaces of revolution, and (c) differential speeds may be obtained by moving one or the other or both of said second drive units differentially along their respective surfaces or revolution.

2. The invention of claim 1 wherein said third axis for each of said nutating elements are non-co-axial with each other.

3. The invention of claim 1 wherein said forward and reverse gears are rotatable about a common axis (78) which is coincident with the axis of rotation of said clutch inputs, outputs and parallel to said second axis, said transmission means outputs being rotatable about axes parallel to said second axis, said input shaft gears, and clutches being contained in a first housing (70) directly secured to and mounted on a second housing (112) containing said transmission means.

4. A compact, reversible, variable speed clutch transmission comprising:

a rotatable input shaft (70) having a drive gear (76) therein and adapted to be connected to a prime mover for rotation about a first axis;

forward and reverse gears (88, 84) mounted for rotation about an axis or axes non-parallel to said first axis, said forward and reverse gears being engaged with said drive gear with said forward gear (88) being located oppositely from said reverse gear (84) with respect to said first axis;

a pair of selectively operable clutches (90) each having an input (92) and an output (94), the input of one clutch being connected to said forward gear and the input of the other clutch being connected to said reverse gear; and a variable speed nutating transmission means having a pair of independently rotatable outputs (116) and an input (110) connected to both said clutch outputs for rotation about a second axis, said transmission means further including a pair of nutating elements (130) each having a surface (132) configuration defined by a non-cylindrical surface of revolution having an axis of revolution, means (126,128) mounting each of said elements for rotation about a third axis coincident with said axis of revolution, said mounting means being mounted for rotation about an axis different than said third axis, a pair of rotatable drive units (134), one for each nutating element, fixedly connected to the associated nutating element, a pair of second drive units (140,142), one for each nutating element, in frictional engagement with the surface of revolution of the associated nutating element, means (150) for selectively moving each of said second drive units along the associated surface of revolution while maintaining frictional engagement therewith, means (124) connecting said mounting means to one of said transmission means input and a corresponding one of said transmission means outputs, and means (136) connecting said rotatable drive units to the other of said mounting means and a corresponding one of said transmission means outputs;

whereby (a) forward and reverse rotation of said transmission means outputs may be achieved by selectively engaging one or the other of said clutches, and (b) variable speeds may be obtained by moving both said second drive units in concert along their respective surfaces of revolution.

* * * * *